United States Patent [19]

Bricks

[11] 4,442,523

[45] Apr. 10, 1984

[54] HIGH POWER METAL VAPOR LASER

[75] Inventor: Bernard G. Bricks, Berwyn, Pa.

[73] Assignee: The United States of America as represented by the Secretary of the Air Force, Washington, D.C.

[21] Appl. No.: 331,750

[22] Filed: Dec. 17, 1981

[51] Int. Cl.³ .............................................. H01S 3/22
[52] U.S. Cl. ......................................... 372/56; 372/61
[58] Field of Search ......................... 372/56, 69, 61, 55

[56] References Cited

U.S. PATENT DOCUMENTS

| 3,654,567 | 4/1972 | Hodgson | 372/56 |
| 3,863,178 | 1/1975 | Ferrar | 378/56 |
| 4,247,830 | 2/1981 | Karras et al. | 372/56 |

Primary Examiner—William L. Sikes
Assistant Examiner—Léon Scott, Jr.
Attorney, Agent, or Firm—Donald J. Singer; Willard R. Matthews

[57] ABSTRACT

A metal vapor laser, and, in particular, a lead vapor laser having a main discharge tube mounted within a pair of electrode support collars. A discharge electrode is mounted at one end of the laser which is sealed by a conventional window and reflector assembly. One of a pair of recirculating wick structures is situated adjacent the discharge electrode and is supported by an elongated support collar outside of and adjacent an end of the main discharge tube. In addition, this wick structure is isolated from the support collar by a separate auxilliary tube. The auxiliary tube is situated in abutting relationship with the end of the discharge tube. This recirculating wick structure does not protrude into the main discharge tube and is kept separate therefrom. A metal foil thermal shield is isolated from the main discharge tube and electrode collar by insulating standoffs. Such an arrangement allows for a high output lead vapor laser in which discharge tube breakage is essentially nonexistant.

3 Claims, 2 Drawing Figures

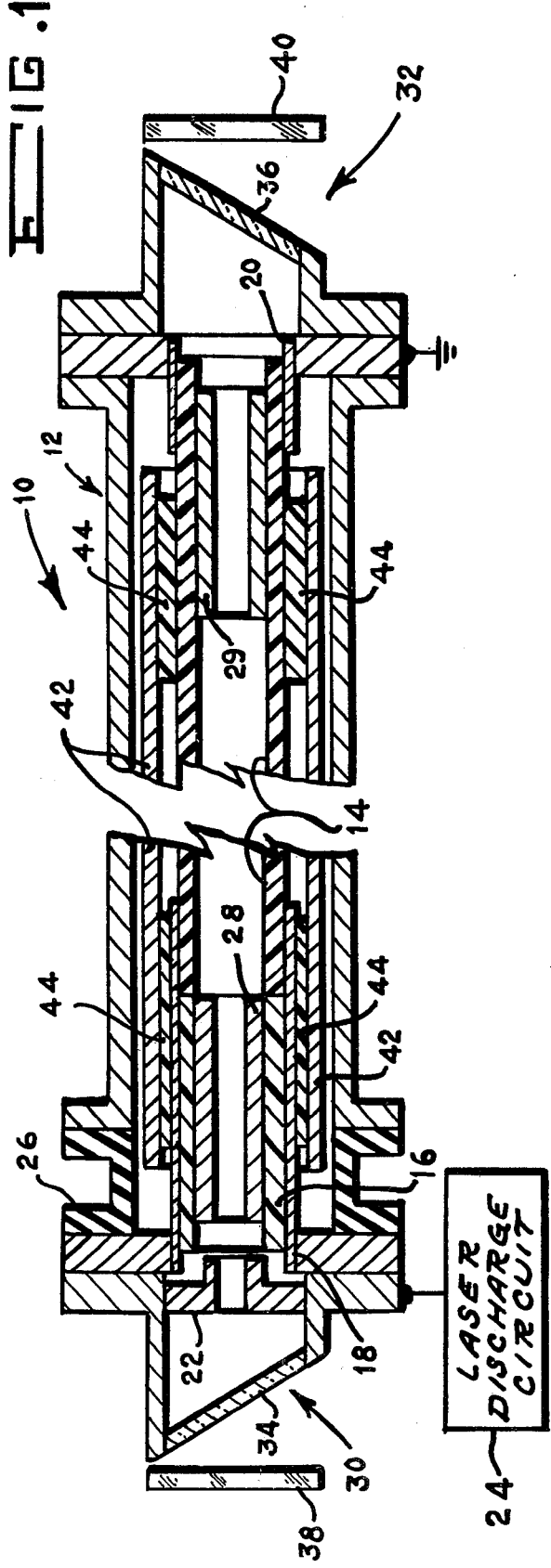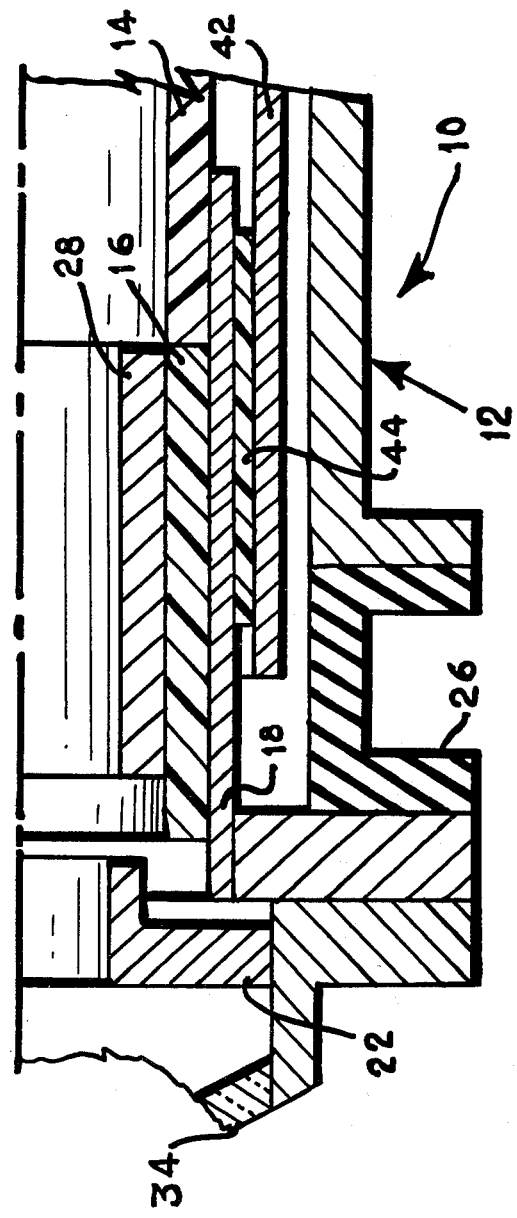

# HIGH POWER METAL VAPOR LASER

STATEMENT OF GOVERNMENT INTEREST

The invention described herein may be manufactured and used by of for the Government for governmental purposes without the payment of any royalty thereon.

BACKGROUND OF THE INVENTION

This invention relates generally to high power metal vapor lasers, and, more particularly to a high power lead vapor laser which incorporates therein a recirculating wick structure.

During the past decade the metal vapor laser has become an important source of high power, high efficiency laser radiation in the visible and near-visible portions of the spectrum. Numerous applications for a laser source in the blue-green region of the spectrum has focused attention on the copper vapor laser. Unfortunately, this concentration on the copper vapor laser has no doubt been responsible, at least in part, for the first that the lead vapor laser has lagged behind that of the copper laser.

However, there exists some applications for which the principal lead vapor laser wavelength at 722.9 nm in the near IR is more suitable. For example, this type of laser is currently being developed and packaged for use as an illuminator for a low light level TV camera. It is therefore becoming more and more beneficial to increase the output power from the lead vapor laser.

One major effort to increase the output power from the lead vapor laser involves exciting the laser with considerably higher input power than typically used in the past. Under high input power conditions, however, it has been found that the ceramic discharge tube utilized within the laser invariably fractured at the high voltage end of the laser after limited operating time. All evidence indicates that the breakage of the ceramic discharge tube is due to stresses induced in the ceramic tube by the high electric field strengths which occur during high input power conditions. In particular, this problem occurs more readily in lead vapor lasers which incorporate electrodes or recirculating wick structures within the walls of the ceramic discharge tube at the high voltage end.

It would therefore be extremely desirable if a high power metal vapor laser and, in particular, the lead vapor laser could be designed which overcomes the problems of discharge tube breakage after short term operation of the laser.

SUMMARY OF THE INVENTION

The instant invention overcomes the problems encountered in the past and as set forth in detail hereinabove by providing a high power lead vapor laser which can be excited with high input power, thereby producing higher output without concurrent difficulty of laser discharge tube breakage.

The high power lead vapor laser of this invention includes a ceramic laser discharge tube mounted within a pair of electrode support collars. The discharge electrode (cathode) is mounted in the window assembly at one end of the laser. One of a pair of recirculating wick structures is located within the laser outside of the confines of the discharge tube. This wick structure is positioned adjacent an elongated electrode support collar, but isolated therefrom by a separate or auxiliary ceramic tube. In addition a metal foil heat shield which surrounds the discharge tube is isolated from the tube and the electrode support collar by insulating standoffs.

With the laser design of this invention the main discharge tube is of a shorter length than heretofore provided with one of the recirculating wick structures being maintained outside of the main discharge tube. Furthermore, the wick structure outside of the discharge tube is supported by an insulating or auxiliary tube adjacent the main discharge tube with the electrode support collars providing a region of support for both the auxiliary tube, wick structure and main discharge tube. In addition the support collars act as an electrode in conjunction with the discharge electrode in order to enhance high power laser operation.

It is therefore an object of this invention to provide a high power metal vapor laser which eliminates the problem of discharge tube breakage.

It is a further object of this invention to provide, in particular, a high power lead vapor laser which eliminates the problem of discharge tube breakage.

It is still a further object of this invention to provide a high power metal vapor laser which incorporates therein the use of a recirculating wick structure and yet ovecomes the problem of discharge tube breakage.

It is still another object of this invention to provide a high power metal vapor laser in which one of the recirculating wick structures does not extend into the main ceramic discharge tube.

It is still a further object of this invention to provide a high power metal vapor laser in which one of the recirculating wick structures is isolated from the electrode support collar by an auxiliary insulated tube.

It is still a further object of this invention to provide a high power metal vapor laser in which the heat shield which surrounds the discharge tube is isolated therefrom by insulating material.

It is still another object of this invention to provide a high power metal vapor laser which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a side elevational view of the high power metal vapor laser of this invention shown in segmented fashion and in cross section; and FIG. 2 is an enlarged side elevational view of a portion of the metal vapor laser of this invention illustrating the relationship between the auxiliary tube, the recirculating wick structure and the main discharge tube and shown in cross section.

DETAILED DESCRIPTION OF THE PREFERRED EMBODIMENT

Reference is now made to FIG. 1 of the drawing which illustrates schematically and in cross section the major components of the metal vapor laser 10 of this invention. Laser 10 includes a preferably cylindrical shaped housing 12 which contains therein a main discharge tube 14 made preferably of an impervious, non-electrically conducting, high density, refractory material such as alumina, zirconia, beryllia or quartz. Adjacent one end of discharge tube 14 is an auxiliary insulating tube 16 having the same interior diameter as tube 14 and also made of a non-electrically conducting material. Tube 16 is in abutting relationship with one end of main discharge tube 14. Supporting discharge tube 14 and auxiliary tube 16 at one end thereof and discharge tube 14 at the other end thereof are a pair of electrically conducting support collars 18 and 20, respectively. Support collar 18 must be of sufficient length so as to extend underneath main discharge tube 14 while also maintaining in its appropriate relationship to discharge tube 14 auxiliary tube 16. In addition to their use in supporting discharge 14 and auxiliary tube 16, support collars 18 and 20 can be utilized as electrodes when in conjunction with a high power discharge electrode (cathode) 22 situated at one end of housing 12.

As shown in FIGS. 1 and 2 of the drawing it is essential in this invention that discharge electrode 22 be located at the end of housing 12 adjacent auxilliary tube 16. Discharge electrode 22 is connected to a conventional laser discharge circuit 24 which is capable of providing sufficient power in the range of, for example, 6-8 KV in order to initiate the lasing action within laser 10. Since the exact makeup of laser discharge circuit 24 is not an essential part of this invention and unnecessary for an understanding of the invention, the details thereof have not been included. An insulating member 26 is provided within housing 2 so as to provide proper insulation between discharge electrode 22 and support collar 18 on one end of laser 10 and support collar 20 at the other end thereof.

Positioned adjacent each end of housing 12 are a pair of recirculating wick structures 28 and 29 of the type set forth in U.S. Pat. No. 4,247,830 dated Jan. 27, 1981. It is essential that wick structure 28 located adjacent discharge electrode 22 be situated outside of discharge tube 14 and on auxiliary tube 16. At the other end of housing 12, wick structure 29 can be located within discharge tube 14. Furthermore, wick structures 28 and 29 are disposed inwardly a short distance from the end of auxiliary tube 16 and discharge tube 14, respectively, so as to prevent electrical contact with either discharge electrode 22 or electrode support collars 18 and 20.

Also included in metal vapor laser 10 are end sections 30 and 32 which include windows 34 and 36. Windows 34 and 36 are used to seal the ends of housing 12. Situated outside of housing 12 and adjacent windows 34 and 36 are reflecting elements in the form of, for example, mirrors 38 and 40, respectively. It should be realized, however, that windows 34 and 36 as well as reflectors 38 and 40 could be substituted for by equivalent elements as long as the appropriate lasing action within housing 12 can take place.

For operation of metal vapor laser 10 any suitable inert gas, such as helium is provided within discharge tube 14 and reacts with, in this particular instance, a lead source which can be contained within the wick structures 28 and 29 so as to provide an appropriate lasing medium. A lead source is utilized with this invention, even though the inventive concept is applicable to any metal vapor laser design, since it is particularly suited for lead vapor lasers which produce high outputs. A conventional metal foil thermal shield 42 encompasses discharge tube 14 and is held in a spaced apart relationship therefrom by means of insulating standoffs 44. The outside ends of wick structures 28 and 29 are placed with respect to thermal shield 42 so that they are sufficiently cool to prevent significant vaporization but not so cold that any condensed vapor will solidify.

As more particularly illustrated in FIG. 2 of the drawing the exact makeup and relationship between wick structure 28, discharge tube 14, auxiliary tube 16, support collar 18 and thermal shield 42 is extremely critical with this invention. Since a high power metal vapor laser and in particular a high power lead laser is extemely susceptible to discharge tube breakage, this invention positions wick structure 28 which is adjacent discharge electrode (cathode) 22 outside of discharge tube 14. In order to do so an auxiliary tube 16 of insulatory material is placed in abutting relationship with an end of discharge tube 14. Wick structure 28 is placed upon auxiliary tube 16 and not within main discharge tube 14. Support collar 18, which may also act as an electrode, must therefore be elongated and placed beneath auxilliary tube 16 as well as discharge tube 14.

In addition to the above provisions it is necessary to stand off thermal shield 42 from discharge tube 14 as well as from support collars 18 and 20 by means of an insulation material 44. As shown from the drawing auxiliary tube 16 has the same internal and external dimensions as discharge tube 14.

Although not limited thereto, typical dimensions which may be used to construct metal vapor laser 10 of this invention would be as follows: a main discharge tube 14 of approximately 30 to 35 inches in length, an auxiliary tube 16 of approximately 6 to 7 inches in length, a support collar 18 of 8 to 10 inches in length and wick structures 28 and 29 of 4 to 7 inches in length. With such an arrangement as set forth in this invention an input supply voltage of between 6 to 8 KV for initiating lasing action in lead vapor laser 10 could produce an output of between 2 to 4 watts.

With the utilization of the elements as set forth in the above description and as shown in FIGS. 1 and 2 of the drawing a high output can result with lead vapor laser 10 without the inherent problems of breakage of the discharge tube 14. By overcoming this difficult problem the instant invention greatly increases the range and capability of metal and, more particularly, lead vapor lasers.

Although this invention has been described with reference to a particular embodiment, it will be understood that this invention is also capable of further and other embodiments within the spirit and scope of the apended claims.

I claim:

1. In a high power metal vapor laser having a housing; means situated adjacent each end of said housing for defining a resonant cavity therebetween, said resonant cavity containing a lasing medium therein; means located adjacent one end of said housing for initiating a lasing action in said housing; a longitudinally extending, non-electrically conductive discharge tube within said housing; means made of an electrically conductive material adjacent the other end of said housing for supporting an end of said discharge tube; and a recirculating wick structure; the improvement therein comprising:

said recirculating wick structure being positioned at said one end of said housing adjacent said initiating means and being located adjacent to and outside of the confines of said discharge tube;

means made of an electrically conductive material adjacent said one end of said housing for supporting both another end of said discharge tube and said wick structure, said supporting means for said discharge tube and said wick structure being of sufficient length so as to be positioned directly in line with and circumscribing both said wick structure and a portion of said discharge tube; and means made of a non-electrically conductive material being directly interposed between said wick structure and said supporting means for said discharge tube and said wick structure for electrically separating said wick structure from said supporting means for said discharge tube and said wick structure;

whereby said metal vapor laser produces a high output and substantially eliminates the problem of discharge tube breakge.

2. In a high power metal vapor laser as defined in claim 1 wherein the improvement further comprises an electrically conductive thermal shield spaced apart from and encompassing said discharge tube, and means made of an insulation material interposed between said discharge tube and said thermal shield for electrically separating said discharge tube from said thermal shield.

3. In a high power metal vapor laser as defined in claim 2 in which the improvement further comprises a high power discharge electrode as said means for initiating said lasing action and said high output power of said laser being in the range 2-4 watts.

* * * * *